Patented May 8, 1928.

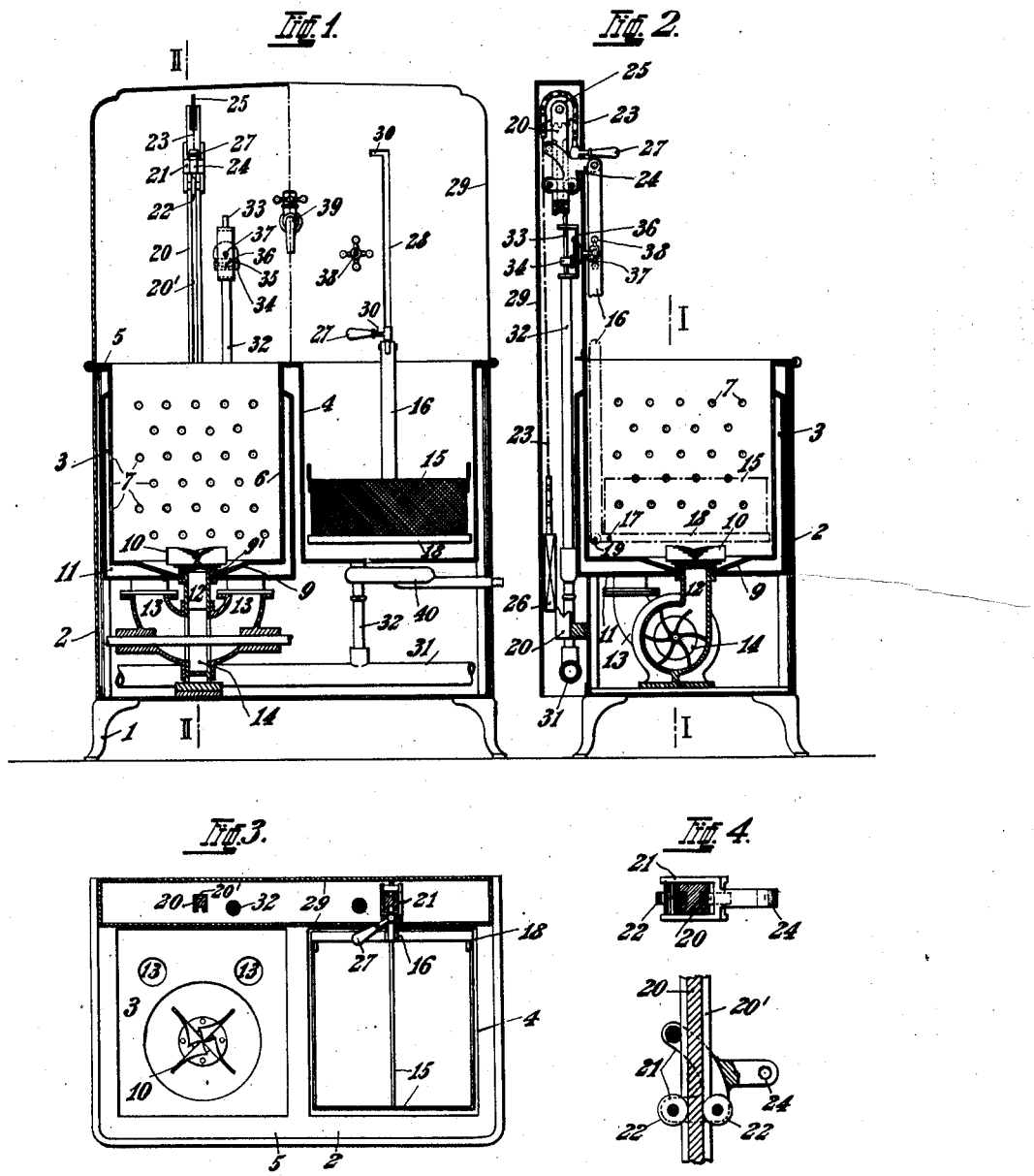

1,668,923

UNITED STATES PATENT OFFICE.

ALFRED RYMANN, OF SUHR-AARAU, SWITZERLAND.

DISHWASHING MACHINE.

Application filed November 25, 1924, Serial No. 752,123, and in Denmark July 16, 1924. Renewed March 29, 1928.

This invention relates to machines for washing plates, dishes and the like comprising supports movable up and down for receiving each a plate-basket to be lowered into and lifted out of separate tanks in a casing common to the same, which casing is provided with a hollow superstructure containing for each support a manually-operable lift that can be secured in its end positions, a conjoint fresh water supply pipe and the actuating devices for the valves controlling the outlets for waste water, and a pump below at least one of the tanks for producing a circulation of water therein, and has for its object to provide an improved construction of machine of the kind referred to. My improved machine for washing plates, dishes and the like is preferably provided with means for causing the water to circulate in that tank into which it is pumped by said pump. The water issuing from the pressure pipe of the pump is caused to flow not vertically upwards, but slantwise in an upward direction and outwards into the corners of the tank.

One embodiment of the invention is illustrated by way of example in the accompanying drawing, wherein:—

Figure 1 is vertical, longitudinal section taken on the line I—I in Figure 2 showing one form of machine according to the invention, the tank with appurtenant parts and the superstructure at the left being in vertical section.

Figure 2 is a vertical transverse section taken on the line II—II in Figure 1,

Figure 3 is a plan, and

Figure 4 shows a detail of the lift in vertical and horizontal section.

Referring to the drawing, two tanks 3 and 4 for water are arranged side by side in an enamelled iron casing 2 of rectangular shape, as seen in plan, having feet 1. The space between the tanks and the side walls of the casing 2 is closed at the top by a plate 5. The tank 3 has its sides and bottom partly made double. The inner side wall 6 is provided with holes 7. The upper bottom 8 has in the middle a funnel shaped portion 9 to which a pressure pipe 12 is connected. To the bottom of the space 11 surrounding the recess 9 suction pipes 13 of an electrically driven centrifugal pump 14 are connected, which pump is accommodated under the tank 3 in the casing 2.

A water distributor 10 is mounted on the dished portion 9 by means of a ring 9'. This distributor consists of four fixed radial blades which are bent and twisted at the inner upper edge and at the top longitudinal edge in the same direction of rotation in the manner shown in the drawing. Soapy water in the tank 3 is sucked down by the pump 14 through the holes 7, and is forced up through the dished portion 9 and the distributor 10 into the tank, whereby a powerful circulation of water is produced which thoroughly cleans the dishes and plates and the like. The distributor causes the water issuing from the pressure pipe 12 to flow not vertically upwards, but slantwise in an upward direction and outwards into the corners of the tank.

A basket 15 of wire gauze serves for holding the utensils e. g. dishes, plates, glasses and the like, to be cleaned.

The basket 15 is placed on a support which has a frame 18 foldable up and down on a suspension rod 16 about an axis 17. The basket frame 18 carries at its lower end a roller 19 which rolls up and down along the one side wall of the tank 3 or 4 containing it when the basket is raised and lowered.

This movement is effected by means of a lift which has a carriage 21 running on a vertical rod 20, to which carriage the rod 16 is detachably pivoted at its upper end. The carriage 21 has two rollers 22 journaled in ball-bearings (not shown) and running in two longitudinal grooves 20' in opposite sides of the guide rod 20. For suspending the rod 16 from the carriage on the one hand, and the latter from a chain on the other hand, the carriage is provided with a laterally extending arm 24. The chain 23 runs over a sprocket wheel 25 journaled at the top of the rod 20 and carries a counterweight 26 for counterbalancing the weight of the carriage 21, 24, the frame 16, 18 and an empty basket 15, so that the lift can be worked by hand, by means of a handle 27 pivoted to swing laterally on the carriage, without much power being expended.

The arm 24 and the handle 27 extend through a vertical slot 28 in the front wall of a hollow superstructure 29 of the casing 2 enclosing the lifts for the two basket-supports. The superstructure 29 is flush at the back with the back wall of the casing or is a continuation thereof and has an ornamen tal appearance. At its upper and lower end the slot 28 has a horizontal extension 30, into which the handle 27 can be swung laterally to secure the lifts in their end positions, i. e. in the upper and lower end positions of the carriage 21, 24 or the frame 16, 18.

Under the tanks 3 and 4 there is a drain pipe 31 to which the tanks are connected below by pipes 32 which extend upwards into the inside of the superstructure 29. The outlet of each tank is normally closed by a valve, not shown, which can be lifted and lowered by a rod 33 extending upwards in the pipe 32. The rod 33 is moved up and down by means of a horizontal link 34 attached to the rod, and a disc 36 having a crank pin 35, the axle 37 of which disc extends through the front wall of the superstructure 29 and carries at its front end a grip 38 for turning it. When the same is turned the link 34 is moved up and down so that the valve rod 33 is raised and lowered.

The tanks can be filled with hot and cold water by means of a cock 39 mounted on the front wall of the superstructure 29 and connected in the latter to hot and cold water pipes, and a tube (not shown) connected to the cock. A heating device 40 is provided under the tank 4; this device is illustrated as a gas-burner, but it may be arranged for using electricity or liquid fuel if desired. Obviously the tank 3 may also be provided with a like heating device.

The described machine is manipulated and operates as follows:—

The tank 3 is preferably filled with hot lye, e. g. with soapy water as mentioned above, and the tank 4 with clean water. The article to be cleaned is first cleaned in the tank 3 from residue of food and from dirt by the turbulent soapy water circulating in the tank. The article which is thus preliminarily cleaned is removed from the tank 3 and put into the tank 4 in which it is rinsed and completely cleaned. If it is necessary to change the water in either of the tanks 3 and 4, it can be emptied by opening the allotted discharge valve, and after closing the latter and opening the cock 39 the tank can be refilled with fresh water.

The machine is made of durable metal, and can be advantageously used in hotels and restaurants for cleansing a large number of plates, dishes and the like in an expeditious and economical manner. The scope of the invention is not to be limited to the specific embodiment hereinbefore described, but only by the appended claim:

What I claim is:

A dish washing machine, comprising a water container adapted to receive the dishes to be washed, a centrifugal pump beneath the container and discharging thereinto, and a water distributor superimposed on the discharge end of the pump, said water distributor comprising a plurality of fixed radial bent blades gradually decreasing in size from their inner to their outer ends.

Signed at Berne, Switzerland, this 10th day of November 1924.

ALFRED RYMANN.